United States Patent [19]
Gsell

[11] Patent Number: 4,968,533
[45] Date of Patent: Nov. 6, 1990

[54] METHOD OF PREPARING MEMBRANES WITH LOW PROTEIN ADSORBABILITY
[75] Inventor: Thomas C. Gsell, Glen Cove, N.Y.
[73] Assignee: Pall Corporation, Glen Cove, N.Y.
[21] Appl. No.: 115,981
[22] Filed: Nov. 2, 1987

Related U.S. Application Data
[62] Division of Ser. No. 945,867, Dec. 23, 1986.
[51] Int. Cl.$^5$ .............................................. B01D 69/02
[52] U.S. Cl. .................................. 427/245; 210/490; 210/500.38
[58] Field of Search ................. 210/500.29, 500.3, 490, 210/500.41, 500.38, 500.43; 55/16, 158; 427/244, 245, 246; 264/41, 49

[56] References Cited
U.S. PATENT DOCUMENTS 3,892,665  7/1975  Steigelmann et al. .............. 210/490
4,214,020  7/1980  Ward et al. ...................... 210/490 X
4,413,074 11/1983  Wrasidlo et al. ................. 210/490 X
4,618,533 10/1986  Steuck ............................ 427/245

FOREIGN PATENT DOCUMENTS
36388  3/1979  Japan ............................. 210/500.29

Primary Examiner—Frank Spear
Attorney, Agent, or Firm—Leydig, Voit & Mayer

[57] ABSTRACT

A method of producing a porous polymeric medium having low adsorbability of amide group-containing materials is provided comprising contacting a porous polymeric substrate having a high affinity for amide group-containing materials with a mixture comprising a polymer having hydroxyl moieties and a cross-linking agent having moieties condensable with the hydroxyl moieties to form a coating of the mixture on the polymeric substrate; removing the coated polymeric substrate from the mixture; and curing the coating on the polymeric substrate to form the porous polymeric medium having low adsorbability of amide group-containing materials.

19 Claims, No Drawings

METHOD OF PREPARING MEMBRANES WITH LOW PROTEIN ADSORBABILITY

This application is a division of application Ser. No. 945,867, filed Dec. 23, 1986.

TECHNICAL FIELD

The present invention relates to a method of preparing a porous medium having a low affinity for amide-containing materials. More particularly, the present invention is directed to a process for preparing a microporous polymeric media useful as filtration membranes having polymeric coatings thereon which produce a low propensity to adsorb proteinaceous materials in the resultant coated membranes.

BACKGROUND ART

In the medical and biological fields, including those involving research, clinical testing and processing, fluids are commonly tested or filtered which contain proteinaceous materials. Many of the media used in diagnostic testing or filtration provide adequate performance with respect to retention of materials sought to be retained, such as solid or gelatinous materials. Commonly, such media used for filtering proteinaceous material-containing fluids also provide rapid flow rates when initially placed in service by virtue of low pressure drops across the membranes. Many of these materials, such as cellulose esters, however, exhibit poor hydrolytic stability and tend to decompose slowly when subjected to continuous use and particularly when exposed to conditions of steam sterilization. There is a tendency by some media, particularly cellulose esters such as cellulose acetate and cellulose nitrate, to decompose as a result of prolonged exposure to solvents or biological materials. In addition, some of these materials tend to be brittle and cellulose nitrate is flammable.

Other media, such as polyamides, particularly nylon, exhibit generally good hydrolytic stability, relatively low flammability and desirable physical properties, such as high strength and flexibility. The polyamides, particularly nylon 66, demonstrate high retention of materials sought to be retained, usually resulting from precise manufacturing control of absolute pore ratings. In many applications, polyamide media are employed in the form of membranes which exhibit low pressure drops across the membrane. However, when such applications involve filtration or passage of solutions containing proteinaceous materials, the pressure differentials across the filtration media frequently increase during use because continued contact of such membranes with proteinaceous materials results in the pores of the membrane being plugged and performance thereby being adversely affected. When such membranes are used in filters, this typically means that flow rates are reduced and high increases in pressure drop are encountered. In many instances, the blockage is irreversible and a costly membrane must be discarded. Thus, a membrane which in most respects is quite suitable for the intended purpose is rendered useless by an undesirable adsorption of proteinaceous material. Furthermore, in many instances the proteinaceous material is not a material which is sought to be removed from the fluid and its retention causes unwanted results. In some instances, the retained protein may be unusable and may, therefore, represent a costly loss.

DISCLOSURE OF THE INVENTION

The present invention is directed to a process for preparing porous polymeric media, preferably in membrane form and microporous in nature, useful as filtration media or as diagnostic media. According to the present invention, a porous, preferably microporous, polymeric medium having a low protein adsorbability is provided which includes (1) a porous polymeric substrate or matrix, preferably liquophilic and most preferably hydrophilic and microporous and typically one having a high affinity or sorbability for amide group-containing materials, particularly proteinaceous materials, and (2) a polymer coating or polymeric material provided at the surface of the porous polymeric substrate, which polymeric coating has a low affinity for amide group-containing materials, particularly proteinaceous materials.

When first placed into use, the porous polymeric media of the present invention exhibit desirable filtration characteristics which are quite similar to those of the untreated polymeric substrate from which they are prepared. Thus, unlike many chemically treated porous polymeric media, the media of the present invention commonly demonstrate low levels of extractable contaminants which are comparable to the low levels of untreated membranes. This is important both to manufacturers and users of such materials to whom it is undesirable to employ additional treatment steps prior to use. The media of the present invention also demonstrate fluid flow behavior when first placed into use, particularly with respect to flow rates and pressure drops, similar to or substantially the same as untreated media formed from the same polymeric substrate. However, as compared to the behavior of untreated polymeric substrates, because of the greatly reduced adsorption of proteinaceous material, the fluid flow properties of the porous polymeric media of the present invention change only gradually with use, as compared to the behavior of untreated porous substrates. Concomitantly, use of the porous, or microporous, polymeric media of the present invention with protein-containing liquids largely eliminates the loss of protein from a product stream.

The polymer coating is a cross-linked polymer resulting from the reaction, typically a condensation reaction, of (a) a polymer having a plurality of hydroxyl moieties with (b) a cross-linking agent having radicals or other moieties capable of reacting with the hydroxyl moieties on the polymer. Preferably, the cross-linking agent also is a polymer.

The porous polymeric medium of the present invention may be prepared by contacting a porous polymeric substrate with a mixture of a polymer having a plurality of hydroxyl moieties and a cross-linking agent having moieties capable of undergoing a reaction, preferably a condensation reaction, with the hydroxyl moieties. After a coating of the mixture is formed on the substrate, the coated substrate is separated from the mixture and cured, preferably by heating.

MODES FOR CARRYING OUT THE INVENTION

The present invention is directed to a method of preparing a porous polymeric media having low affinity for or adsorbability of amide group-containing materials, such as proteinaceous materials, which media include a porous polymeric substrate having a coating or surface-modifying polymeric material thereon that exhibits a low affinity for amide group-containing materials, particularly proteinaceous materials. The affinity for proteinaceous materials of the surface-modified polymeric medium is much lower than the polymeric substrate from which it is formed. The term "proteinaceous materials", as used herein, includes proteins and amino acids and may include substances with sterically accessible amide moieties or substances in which the proportion of amide moieties to other moieties is high.

Terms such as "surface", "polymeric substrate surface", "membrane surface", or like terms, used in the singular or plural, are intended herein to include not only the gross surfaces, i.e., the external or outer surfaces, such as those which are exposed to view, but also the internal surfaces or those surfaces which define the pores of the polymeric substrate or medium, that is, the substrate or membrane surface is that portion of the polymeric substrate or membrane medium which is capable, during use, of being contacted by a fluid, particularly a liquid. As distinguished from the "polymeric substrate surface area", which refers to the area of both internal and external surfaces, the exposed planar dimensional area of the material is herein referred to as the "polymeric substrate area".

The media of the present invention may be prepared from polymeric substrates or matrices which do not react adversely with either the compounds used to form the polymer coating or the solvents used to form the solution of such compounds. When intended as a filtration medium, where passage of liquids through the medium will be encountered, those materials which exhibit desirable flow properties will generally be employed. Thus, liquophilic materials are preferred and hydrophilic media are most preferred. "Liquophilicity", as used herein, refers to the wettability of the substrate or membrane medium by the liquid(s) with which it is contacted. The wettability or liquophilicity of a solid structure, e.g., a membrane, is a function of that structure's critical surface energy and the surface tension of the applied liquid. If the critical surface energy is at least as high as the surface tension of the liquid, the liquid will spontaneously wet the solid structure. For example, a microporous membrane having a critical surface energy of 72 dynes/cm or higher will be wetted by water which has a surface tension of 72 dynes/cm, i.e., it is hydrophilic.

The capability of a porous structure (substrate medium, membrane, etc.) to be wetted by a liquid can be determined by placing a drop of liquid on the porous structure. The angle of contact provides a quantitative measure of wetting. A very high angle of contact indicates poor wetting, while a zero angle of contact defines complete or perfect wetting. Materials used in the subject invention as the substrate and also the completed medium are characterized, preferably, as being readily or spontaneously wetted by the applied liquid and have a low angle of contact with the applied liquid. Indeed, when a drop of a liquid(s) used with the porous structures of the present invention is placed on a preferred spontaneously wettable or liquophilic microporous substrate or medium formed therefrom, the drop of liquid penetrates and wets the substrate or medium, effectively providing a zero angle of contact therewith. However, with proper treatment, such as that known to filtration and related arts, hydrophobic media may also be employed.

Among the porous polymeric substrates which may, and in most cases are, preferred to be employed in the present invention are those which normally exhibit a high affinity toward amide group-containing materials, particularly proteinaceous materials. Examples of such materials are polyamides, polysulfones, polyvinylidene difluoride, and polyacrylonitrile. Particularly preferred are polyamides, such as the nylons. The preferred nylons include polyhexamethylene adipamide, poly-$\epsilon$-caprolactam, polymethylene sebacamide, poly-7-aminoheptanoamide, or polyhexamethylene azeleamide, with polyhexamethylene adipamide (nylon 66) being most preferred. Particularly preferred are skinless, substantially alcoholinsoluble, hydrophilic polyamide membranes. These memebranes are also characterized as having a ratio of $CH_2$:amide NHCO within a range of about 5:1 to about 7:1. The present invention may also use polymeric substrates which exhibit lower affinity to proteinaceous materials. Examples of such materials include cellulose nitrate, polyvinylidene difluoride (PVDF), and polytetrafluoroethylene (PTFE), both PVDF and PTFE being in a hydrophilic form.

When the porous polymeric media of the present invention are employed as filtration media, they typically have absolute pore ratings (pore diameters) in the range of about 0.05 to about 10 microns, preferably about 0.1 to about 3 microns, the preferred pore diameter range corresponding to a microporous medium. The porous polymeric media of the present invention, when employed as filtration media, suitably have thicknesses of about 0.0005 to about 0.02 inch (about 0.0125 to about 0.5 mm), typically 0.001 to about 0.010 inch (about 0.0255 to about 0.25 mm). The voids volume (percentage voids) of materials primarily intended as filtration media are suitably about 30 to about 95 percent, typically about 50 to about 90 percent. Particularly preferred as the porous polymeric substrates of the present invention are the hydrophilic polyamide membranes described in U.S. Pat. No. 4,340,479, assigned to Pall Corporation and incorporated herein by reference. A membrane material which is particularly useful for the present invention is available from Pall Corporation under the trademark ULTIPOR $N_{66}$.

The polymer coating having low affinity for amide group-containing materials, particularly proteinaceous materials, may be any polymer formed in situ which demonstrates a low adsorption of amide group-containing material such as proteinaceous material as measured by the Bovine Serum Albumin Adsorption Test discussed in greater detail below. According to this test, polymers which adsorb less than 100 micrograms/cm$^2$ of proteinaceous material are considered, for purposes of the present invention, to have a low affinity for proteinaceous materials, and materials adsorbing less than 35 micrograms/cm$^2$ are preferred. Conversely, for purposes of the present invention, polymers which adsorb more than about 100 micrograms/cm$^2$ of proteinaceous material are considered to have a high affinity for proteinaceous material. Typically, such low affinity polymers are cross-linked polymers rich in hydroxyl groups, preferably liquophilic and particularly preferred are polymers which are hydrophilic. The polymeric coating is formed in situ, preferably, by a condensation reaction and preferably from a polymer which contains a plurality of hydroxyl moieties and acrossing linking agent. The hydroxyl moiety-containing polymers which are most preferred are those in which the hydroxyl group is pendant. By "pendant" is meant the group is not attached to a carbon atom which forms part of the polymer's backbone but is bound to a carbon atom that is separated from the backbone as, for example, a branching carbon atom.

The hydroxyl moiety-containing organic compound reacts in situ with a cross-linking agent containing moieties which are capable of reacting with hydroxyl moieties. To establish cross-linking, the hydroxyl moiety-containing polymer includes at least two hydroxyl groups capable of reacting with moieties on the cross-linking agent which itself contains at least two moieties capable of reacting with a hydroxyl moiety. The cross-linking agent used to form the polymeric coating may be either monomeric or polymeric, preferably the latter. Both the cross-linking agent and the hydroxyl moiety-containing polymer are, preferably, substantially soluble in the solvent employed. Typically, at the concentrations employed, there will remain no more than about 1 percent undissolved hydroxyl moiety-containing polymer, based on the weight of the hydroxyl moiety-containing polymer employed. Likewise, there will typically not be more than about 1 percent undissolved cross-linking agent, based on the weight of the cross-linking agent employed. In addition, the hydroxyl moiety-containing polymer should not have an excessively high molecular weight. Typically, the hydroxyl moiety-containing polymer has a weight average molecular weight of no more than about 500,000, and preferably greater than about 10,000. Examples of suitable hydroxyl moiety-containing polymers include cellulose derivatives, such as cellulose acetate and esters of cellulose; and hydroxyalkyl ethers of cellulose, such as hydroxypropyl cellulose and hydroxyethyl cellulose; carboxylated alkyl cellulose, such as carboxymethyl cellulose; polyhydroxyalkyl esters of acrylic acid and methacrylic acid, such as polyhydroxyethyl methacrylate; polyvinyl alcohol and starch. Preferred are the hydroxyalkyl ethers of cellulose with hydroxypropyl cellulose being most preferred.

The cross-linking agent contains at least two moieties or is capable of forming at least two moieties, the same or different, which will react with the hydroxyl moieties of the hydroxyl moiety-containing polymer according to reactions known to the organic chemist. Examples include compounds having acidic moieties, such as carboxylic acid groups and phenolic groups; other compounds containing hydroxyl groups and particularly those containing $CH_2OH$ groups such as methylol compounds and particularly those in which the hydroxyl-bearing carbon is bound to a nitrogen atom; resoles; amide groups; and aldehydes, such as formaldehyde and glutardialdehyde. As indicated above, the cross-linking agent contains or forms during reaction at least two such moieties capable of reacting with hydroxyl groups. When the cross-linking agent is a polymer, examples of preferred polymers capable of reacting with the hydroxyl moiety-containing organic compounds are copolymers of acrylic acid and acrylamide, copolymers of acrylic acid and N-methylol acrylamide and polyacrylic acid.

Typically, and preferably, when the hydroxyl moiety-containing compound contains a large number of hydroxyl groups, such as found in cellulose-derived polymers, after reaction with the cross-linking agent, there will be an excess of unreacted hydroxyl moieties in the polymer coating having low affinity for proteinaceous material.

As suggested above, both the hydroxyl moiety-containing polymer and the cross-linking agent which react to form the polymer coating should be substantially completely, if not totally, soluble in the solvent system used to prepare a solution of the reactants. Likewise, a solvent is employed which will maximize solubility, not adversely affect the polymeric substrate nor any of the reactants, while permitting satisfactory cross-linking. Preferred solvents include polar solvents, particularly hydroxylated solvents such as water, lower aliphatic alcohols, such as ethanol, and mixtures thereof.

Solutions of the hydroxyl-containing polymer range in concentration from about 0.05 to about 4.0 percent by weight, preferably about 0.1 to about 2.0 percent by weight, based on the total weight of solution. The cross-linking agent which reacts with the hydroxyl moiety-containing polymer, typically a cross-linking polymer, is present in the solution at a concentration of about 0.01 to about 0.75 weight percent, preferably about 0.05 to about 0.5 percent by weight, based on the total weight of the solution. The weight ratio of the hydroxyl moiety-containing polymer, to the second compound, the cross-linking agent, preferably present as a polymer, ranges typically from about 1:5 to about 40:1. The maximum concentration of the polymer coating, and, therefore, the individual concentrations of each of the compounds used to form the coating, is selected so as to provide the porous polymeric medium with a substantially lower affinity for proteinaceous materials but not sufficiently high to result in "plugging" of the substrate so as to adversely affect the flow properties of the media.

The procedure used to coat the porous polymeric support or substrate is not particularly critical and methods known to those skilled in the coating arts may be employed. For example, in a batch process, a portion of the substrate may be contacted with, such as being immersed in a coating solution of the hydroxyl moiety-containing polymer and cross-linking agent for sufficient time to "saturate" the polymeric substrate. In a continuous process, the substrate is contacted with, such as being passed through, the solution of components used to form the polymer coating for sufficient time to saturate the substrate, typically about 0.1 to about 5 seconds.

When the preferred hydrophilic microporous polymeric substrate is employed to prepare the porous polymeric media, no pretreatment is required. However, when a liquophobic or hydrophobic material is employed as the substrate, it must be wetted prior to saturation or impregnation with the coating solution. Wetting may be accomplished by contacting the hydrophobic substrate with a liquid, such as water, containing a wetting agent or with a water miscible liquid having a lower surface tension than water, such as a lower aliphatic alcohol, particularly ethanol or a mixture of ethanol and water. The liquid or solution used to wet the hydrophobic polymeric substrate is then displaced from the substrate by contacting and saturating the substrate with the solvent used to form the coating solution, preferably water. Thereafter, the water-saturated hydrophobic substrate may be contacted with the coating solution in the same manner as a hydrophilic substrate.

After saturation of the polymeric substrate, excess coating solution may be removed by blotting, calendering or the like. Drying and curing of the coated substrate may be accomplished in separate steps or, preferably, in a single step. Temperatures and periods of heating and drying will depend upon the particular porous polymeric substrate, the amount of coating solution present in the substrate, and the concentrations and types of polymer and cross-linking agent which form the coating solution. Typically, when a porous nylon substrate is employed and both of the coating compounds are polymeric, a combined drying and curing operation may be performed for a period of about 2 to about 45 minutes at a temperature on the order of about 100 to about 165 degrees C. Drying and curing may be accomplished by techniques known to those involved in curing polymer compositions. Examples of suitable drying and curing techniques include use of an enclosed oven, an infrared oven or by contact between the coated substrate and a heated metal drum. When batch drying and curing is performed on smaller portions of substrate, shrinkage may be reduced by securing the coated polymer to a frame before drying.

Hydrophilic porous and microporous polymeric media produced according to the present invention demonstrate high fluid-permeability. More significantly, however, these media have protein adsorption levels, as determined by the Bovine Serum Albumin Protein Adsorption Test, of about 50 percent to about 1 percent of the uncoated media, typically about 20 percent to about 1.5 percent of the amount.

While the invention is susceptible to various modifications and alternative forms, certain specific embodiments thereof are described in the examples set forth below. It should be understood, however, that these examples are not intended to limit the invention to the particular forms disclosed but, on the contrary, the intention is to cover all modifications, equivalents and alternatives falling within the spirit and scope of the invention.

EXAMPLES

Example 1

Preparation Of A Coating Solution

A solution used to form a polymer coating having a low affinity for proteinaceous material was prepared by adding 40 grams of CARBOSET 531 (a thermosetting copolymer of acrylic acid and N-methylol acrylamide containing 25 percent solids) to a stirred solution of 1,910 grams of deionized water containing 50 grams of tertiary butyl alcohol. After approximately 10 minutes of mixing, during which the CARBOSET 531 had fully dissolved, 20 grams of Klucel LF (hydroxypropyl cellulose, available from Hercules) was added with continued stirring. After approximately 3 hours of continuous stirring, the Klucel was fully dissolved and the solution was filtered through a filter membrane of ULTIPOR N66 (a registered trademark for a microporous, hydrophilic nylon 66 filter media available from Pall Corporation) having an absolute removal rating of 0.1 micron to remove any residual solid material. The coating solution contained about 1.0 weight percent, based on the total weight of solution of hydroxypropyl cellulose, and about 0.5 weight percent of acrylic acid/N-methylol acrylamide copolymer.

Example 2

Preparation Of A Porous Polymeric Medium Having Low Affinity For Proteinaceous Material:

A 9 inch by portion of a microporous hydrophilic nylon 66 membrane (ULTIPOR $N_{66}$, available from Pall Corporation, having a 0.2 micron absolute pore rating) was contacted with the solution prepared in Example 1 for a period of about 5 seconds. The membrane was removed from the coating solution and excess fluid was blotted from its surface. Clamped to a frame, the membrane was placed in a recirculating air oven at a temperature of 150 degrees C. for a period of 30 minutes.

Example 3

Bovine Serum Albumin (BSA) Protein Adsorption Test:

The BSA protein absorption test was performed according to a standardized procedure. Accordingly, a solution containing 0.1 mg/ml unlabelled BSA and about $10^5$ cpm/ml $^{125}$I-labelled BSA was prepared in a phosphate buffered saline (PBS) solution having a pH of 7.2. The PBS solution contained 0.2 grams per liter of monobasic sodium phosphate, 1.2 grams per liter of anhydrous, dibasic sodium phosphate, and 8.77 grams per liter sodium chloride in deionized water.

A sample of a porous test medium was placed in a syringe-type filter holder. Fluid communication between a reservoir holding the BSA test solution and the syringe-type filter was provided by a length of Tygon (Registered Trademark) tubing and a peristaltic pump arranged in series. Prior to insertion of a porous test medium sample into the filter holder, the potential non-specific protein binding sites on both the tubing and the filter holder were blocked by recirculating 1.0 ml of the BSA solution through the tubing and filter holder at a flow rate of 0.3 ml/min for a period of 15 minutes. Following recirculation, the BSA solution was drained from the tubing and filter holder. Residual BSA solution was removed from the tubing and filter holder by circulating about 2.0 ml of PBS through the tubing and filter holder at a flow rate of about 0.3 ml/min for several minutes at ambient temperature.

A 13 mm diameter disc of porous polymeric test medium was placed into the blocked filter holder. The $^{125}$I-BSA solution was then transferred from the reservoir to the filter holder at a flow rate of 0.8 ml/min/cm$^2$. The test was continued for a period of 5 minutes, during which time 391 micrograms/cm$^2$ of BSA were transferred to the filter holder. The test medium was then removed from the filter holder and blotted dry on filter paper. The amount of protein (BSA) adsorbed by the membrane disc was determined by radioactive counting in a gamma counter.

The results reported in Table 1 are for untreated membranes and membranes treated according to and with the materials of Examples 1 and 2 to provide a porous medium having a low affinity for proteinaceous material. In each instance, the same hydrophilic nylon material was used. These results provide the amount of BSA adsorbed by the membrane divided by the effective filtration area.

TABLE 1

| BSA PROTEIN ADSORPTION | |
|---|---|
| Product Of Examples 1 And 2 | 3.0 Micrograms/cm$^2$ |
| Untreated Membrane | 190 Micrograms/cm$^2$ |

Example 4

Permanence Of Coating:

Porous polymeric filter membranes prepared according to Examples 1 and 2 were subjected to extensive washing with water at 34 degrees C at the flow rates indicated in Table 2. Thereafter, the membrances were tested for BSA protein adsorption with the results set forth below.

TABLE 2

| Flow Rate (liter/minute/foot$^2$) | Total Water Passed (liters/foot$^2$) | BSA Protein Adsorption (micrograms/cm$^2$) |
| --- | --- | --- |
| 8 | 11,520 | 5.1 |
| 15 | 40,500 | 5.2 |

The above results suggest that a procedure for forming a coated porous polymeric media employing hydroxypropyl cellulose and a copolymer of acrylic acid and N-methylol acrylamide produces media having a high degree of permanence and a low degree of protein adsorption. Thus, Klucel LF, which is completely water soluble itself, is not removed from media prepared according to Examples 1 and 2.

I claim:

1. A method of producing a porous polymeric medium having low adsorbability of amide group-containing materials comprising:
   contacting a porous polymeric substrate having a high affinity for amide group-containing materials with a mixture comprising a polymer having hydroxyl moieties and a cross-linking agent having moieties condensable with said hydroxyl moieties to form a coating of said mixture on said polymeric substrate;
   removing said coated polymeric substrate from said mixture; and
   curing said coating on said polymeric substrate to form said porous polymeric medium having low adsorbability of amide group-containing materials.

2. The method of making a porous polymeric medium of claim 1 wherein said porous polymeric substrate comprises a polyamide.

3. The method of making a porous polymeric medium of claim 2 wherein said polyamide is nylon 66.

4. The method of making a porous polymeric medium of claim 2 wherein said porous polymeric substrate comprises a skinless, substantially alcohol-insoluble hydrophilic polyamide membrane.

5. The method of making a porous polymeric medium of claim 1 wherein said polymer coating comprises a cross-linked condensation polymer.

6. The method of making a porous polymeric medium of claim 5 wherein said cross-linked condensation polymer is formed by a condensation reaction between said hydroxyl group-containing polymer and said cross-linking agent.

7. The method of making a porous polymeric medium of claim 1 wherein said porous polymeric substrate is microporous.

8. The method of making a porous polymeric medium of claim 1 wherein said cross-linking agent is a polymeric compound.

9. The method of making a porous polymeric medium of claim 1 wherein said polymer having hydroxyl moieties is hydroxypropyl cellulose.

10. The method of making a porous polymeric medium of claim 1 wherein said cross-linking agent is a copolymer of acrylic acid and N-methylol acrylamide.

11. The method of making a porous polymeric medium of claim 1 wherein said substrate comprises microporous, hydrophilic nylon 66 and said polymer coating is a product formed from the reaction of hydroxypropyl cellulose and a copolymer of acrylic acid and N-methylol acrylamide.

12. The method of making a porous polymeric medium of claim 1 wherein the affinity for amide group-containing materials of said porous polymeric medium is less than that of said porous polymeric substrate.

13. The method of making a porous polymeric medium of claim 1 wherein said coating is formed on the surface of said polymeric substrate.

14. The method of making a porous polymeric medium of claim 1 wherein said porous polymeric substrate comprises a liquophilic material.

15. The method of making a porous polymeric medium of claim 1 wherein said porous polymeric substrate comprises a hydrophilic material.

16. The method of making a porous polymeric medium of claim 1 wherein said porous polymeric substrate comprises a membrane.

17. The method of making a porous polymeric medium of claim 1 wherein said hydroxyl group-containing polymer is a cellulose derivative.

18. The method of making a porous polymeric medium of claim 17 wherein said cellulose derivative is an hydroxyalkyl ether of cellulose.

19. The method of making a porous polymeric medium of claim 1 wherein said cross-linking agent has at least two moieties condensable with said hydroxyl moieties.

* * * * *